United States Patent [19]
Devlin

[11] 3,791,159
[45] Feb. 12, 1974

[54] METHOD FOR CONVERTING A LIQUID COMESTIBLE TO A PARTIALLY FROZEN CONDITION

[75] Inventor: Edward J. Devlin, Madison, Conn.

[73] Assignee: Glacier Ware, Inc., Clinton, Conn.

[22] Filed: July 21, 1971

[21] Appl. No.: 164,790

Related U.S. Application Data

[63] Continuation-in-part of Ser. No. 53,231, July 8, 1970.

[52] U.S. Cl. .................................... 62/68, 99/136
[51] Int. Cl. ............................................. A23g 5/00
[58] Field of Search ..... 62/1, 66, 68, 451, 530, 529, 62/114, 438, 430, 114; 99/136

[56] References Cited
UNITED STATES PATENTS

| | | | |
|---|---|---|---|
| 1,978,176 | 10/1934 | Steenstrup | 62/69 |
| 672,036 | 3/1901 | Freeston | 62/348 X |
| 3,468,137 | 9/1969 | Welty | 62/306 X |
| 3,394,562 | 7/1968 | Coleman | 62/457 |
| 2,619,808 | 12/1952 | Baird | 62/438 X |

FOREIGN PATENTS OR APPLICATIONS
239,712   9/1925   Great Britain ........................ 62/457

*Primary Examiner*—William E. Wayner
*Attorney, Agent, or Firm*—Fitch, Even, Tabin & Luedeka

[57] ABSTRACT

A method for converting an individual serving portion of a liquid comestible such as a carbonated beverage or the like to a partially frozen, two phase composite mixture of macroscopically uniform thixotropic consistency. In the method, an enclosed conversion zone for containing the comestible and a refrigerant zone containing a refrigerant in a particular mass ratio to the comestible mass are provided. The refrigerant zone partially surrounds and is in heat transfer relationship with the conversion zone. The refrigerant is frozen and the liquid comestible is subsequently placed in the conversion zone and converted to a slush-like condition by transfer of heat energy from the conversion zone to the refrigerant zone.

7 Claims, 2 Drawing Figures

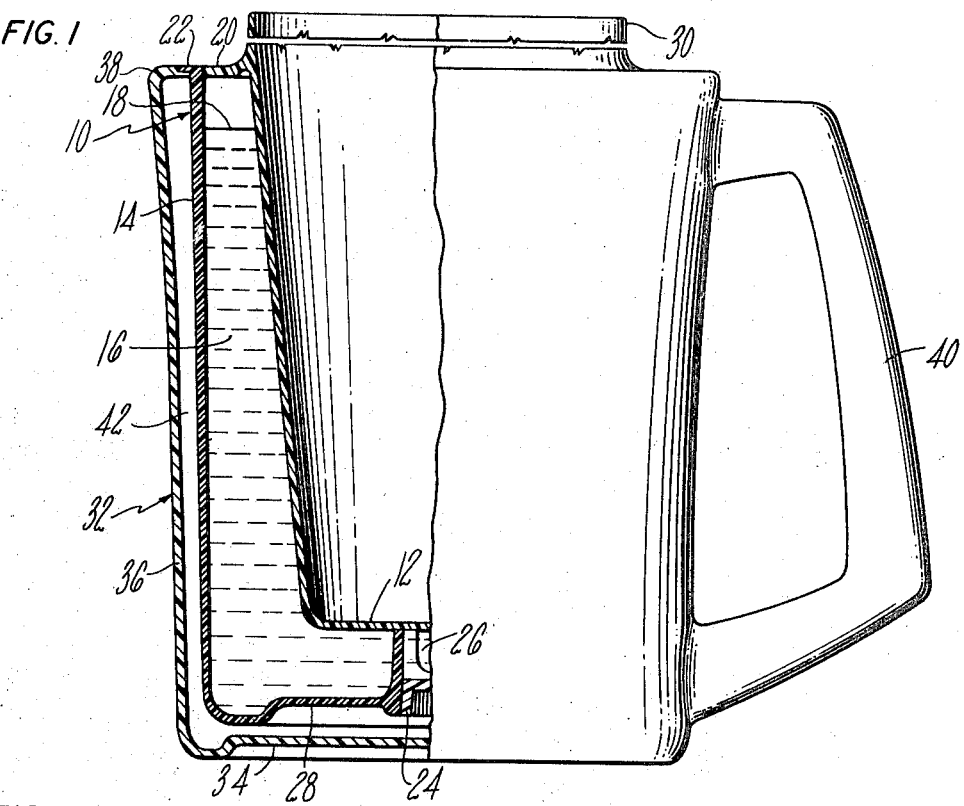

METHOD FOR CONVERTING A LIQUID COMESTIBLE TO A PARTIALLY FROZEN CONDITION

This application is a continuation-in-part of copending application Ser. No. 53,231, filed July 8, 1970 and entitled "Liquid Cooling Container and Method for Converting Potable Liquid to Slush."

The present invention is directed to a method for converting a potable liquid to a two-phase, semi-congealed state. More particularly, the present invention is directed to a method for converting an individual serving portion of a liquid comestible such as a carbonated soft drink or the like to a partially frozen, two-phase composite mixture of uniform thixotropic consistency.

Carbonated beverages which are cooled to a slush-like or thixotropic consistency suitable for consumption with either a spoon or a straw, are generally known as frozen carbonated beverages. Such frozen carbonated beverages comprise an unfrozen liquid component of the initial beverage in intimate and macroscopically uniform admixture with a finely divided, delicately crystalline ice phase derived in situ from the beverage and in thermal equilibrium with the liquid component. Frozen carbonated beverages have a unique consistency and mouth feel and are to be distinguished from a mixture of mechanically comminuted solid ice with a flavoring liquid. Such slush-like frozen beverages have achieved popularity as a consumer item, particularly in warm climate regions where their distinctive and uniquely refreshing characteristics are particularly advantageous.

Frozen carbonated beverages are conventionally produced and dispensed directly to the consumer by means of relatively complicated, expensive, and bulky machinery designed to be capable of reliably providing a particular set of critical conditions necessary for producing the distinctive physical characteristics of the frozen beverages. Such machinery is generally adapted for use in conjunction with vending equipment or in public locations such as park and beach concessions, resorts and convenience stores. As this machinery is generally unsuited for home or personal use by the individual consumer, the enjoyment of frozen carbonated beverages has generally been limited to such public locations having machinery of this type. In this regard, a method which does not require expensive, specially adapted and complex machinery, and by which individual consumers could convert ordinary carbonated beverages or the like directly to a semi-congealed condition, would be desirable.

Accordingly, a primary object of this invention is to provide a method for making a frozen carbonated beverage which is particularly suited for home use and which is capable of converting an ordinary carbonated beverage or the like to a semi-congealed state without any requirements for expensive special equipment. An additional object is the provision of such a method which may be carried out by means of a relatively low cost liquid cooling container which may be used repeatedly, even by children, in making high quality frozen carbonated beverages and the like. Still another object is the provision of such a method which may be carried out in part through the use of a conventional refrigerator, and which will reliably produce an end product of quality flavor which may be maintained frozen without dilution of its flavor over a substantial period of time.

These and other objects of the invention are more particularly set forth in the following detailed description and in the accompanying drawings of which:

FIGS. 1 and 2 are side views, partially broken away and partially in section, of liquid cooling containers suitable for use in carrying out the method of the present invention.

The present invention is directed to a method for converting an individual serving portion of a naturally sweetened liquid comestible to a partially frozen, two-phase composite mixture of macroscopically uniform thixotropic consistency. The method is particularly suited for converting carbonated beverages such as conventional carbonated soft drinks, into frozen carbonated beverages which comprise an unfrozen component of the initial beverage in intimate and uniform admixture with a finely divided crystalline ice phase derived in situ from the beverage.

Generally, the method of the present invention comprises the steps of providing a conversion zone for containing the carbonated beverage, and an enclosed refrigerant zone which surrounds the conversion zone to accommodate a suitable refrigerant according to a particular relationship with respect to the mass of the carbonated beverage which may be contained in the conversion zone. In order to convert the beverage to the desired partially frozen state, the refrigerant is first frozen, and the carbonated beverage is then introduced into the conversion zone which is surrounded by the frozen refrigerant. The freezing of the beverage to the desired semi-congealed state is accomplished by transfer of heat from the beverage to the refrigerant.

It is a particularly advantageous feature of the present method that the provision of the conversion zone, the refrigerant zone, and the refrigerant, in the proper volume and mass ratios, may be accomplished quite simply by the consumer through the use of a portable liquid cooling container of appropriate design. In carrying out the process, such a liquid cooling container may simply be placed in a refrigerator to cool the refrigerant, and subsequently removed from the refrigerator after the refrigerant has been frozen. While exposed to room temperature conditions, the conversion zone of such a cooling container may then be filled with the carbonated beverage, which is rapidly cooled by the transfer of heat to the refrigerant to effect conversion to a semi-congealed, ice containing condition. Moreover, the frozen beverage thus provided may be maintained in a semi-frozen state for a considerable length of time in such a container in which the latent heat of fusion of the frozen refrigerant is in excess of that required to initially freeze the finely dispersed crystalline ice phase of the converted beverage. After the frozen beverage has been consumed, the refrigerant in the container may be frozen again for repeated use.

Referring now to the drawings, a liquid cooling container 10 suitable for use in carrying out the present method is shown in FIG. 1. The container 10 has an inner receptacle 12 with an open top and an outer receptacle 14 which symmetrically surrounds the inner receptacle 12. The inner receptacle 12 defines a conversion zone for containing a carbonated beverage. Upper end portions of the inner and outer receptacles 12, 14 are suitably sealed to form a unitary double-walled cooling unit having a compartment 16 therebetween, and to thereby define a refrigerant zone surrounding the conversion zone within the inner receptacle 12. The container 10 is conveniently formed of a suitably tough plastic material, such as polyethylene. A suitable refrigerant 18 which is preferably a nontoxic, nonvolatile aqueous mixture or solution having a freezing point substantially below 32°F., for example, propylene glycol, is provided within the sealed compartment 16. Aqueous mixtures or solutions have the advantage of a high latent heat of fusion and may be provided with a freezing point in a range below 32°F. which depends upon the molar ratio and water and solute. For example, a mixture or solution of water and nonvolatile propylene glycol is a normally liquid refrigerant with a high heat absorbing capacity and a freezing point in a range below 32°F. which depends upon the relative proportions of these components.

More specifically, the two receptacles 12, 14 are preferably made from suitable plastic moldings and are each provided with cooperating upper flanges 20, 22 which may be spin welded together in a unitary construction to effect a fluidtight seal about the top of the outer receptacle 14. Thereafter the container 10 may be inverted and the compartment 16 may be nearly completely filled with refrigerant 18 which is then hermetically sealed within the compartment 16 by spin welding a plastic plug 24 to close an opening 26 in a bottom wall 28 of the outer receptacle 14.

In the illustrated cooling container, a generally cylindrical upstanding annular lip 30, preferably of insulating plastic material, may be formed in continuation with the inner receptacle 12 to extend upwardly therefrom a substantial distance above the outer receptacle 14 in a manner shown in U.S. Pat. No. Re. 26,724 to Roger L. Paquin, reissued Nov. 25, 1969 and assigned to the assignee of this invention. In addition, an outer member is also shown in the container illustrated in FIG. 1 which may be preferably blow molded from a suitable plastic material to provide an open-ended shell 32 having an imperforate bottom wall 34 and integrally formed cylindrical side wall 36 extending upwardly from the bottom wall 34. At the top of the side wall 36 is an upper inwardly turned lip 38 for supporting the radially extending flange 22 formed on the outer receptacle 14 for centrally positioning the cooling container 10 within the shell 32. As more fully described in U.S. Pat. No. 3,302,428 to A.M. Stoner et al. issued Feb. 7, 1969, and assigned to the assignee of this invention, the outer shell 32 additionally may be provided with a convenient integrally formed handle 40 for holding the cooling container 10 without the discomfort of placing one's hand in direct contact with the cooling container 10 upon its being frozen, due to the insulating dead air space 42 surrounding the container by the provision of its shell 32.

To provide a liquid cooling container 10 which is particularly suited for home use under room temperature conditions in cooling liquids to at least a semi-congealed or partly frozen condition having a slush-like thixotropic consistency, whereby even young children can make a frozen carbonated beverage in accordance with this invention, the refrigerant zone defined by the sealed compartment 16 is of a predetermined volume relative to the volume of the inner receptacle 12 to contain a mass of refrigerant 18 which when frozen is sufficient to lower the temperature of a liquid added to the inner receptacle 12 to a point at which the liquid is converted to an ice-containing condition. While it will be recognized that many combinations of refrigerants of varying latent heats of fusion may be utilized in differing mass ratios to that of the liquid to be cooled, it has been found that for refrigerants having a freezing point, say, from 0° to 31°F. when used in a range of mass ratios of refrigerant to the liquid to be cooled from 0.7/1 to 3.0/1, effectively convert a liquid preferably precooled to a temperature of about 35° to 45°F. in a relatively short period of time to a slush condition. More specifically, a refrigerant having a freezing point of about 20°F. and having a mass ratio of approximately two parts refrigerant to one part liquid soft drink precooled to a temperature of about 38°F. has been found to make excellent slush at room temperature, say, about 60°F., usually within 10 minutes or less of having added the slightly chilled liquid soft drink to the inner receptacle 12.

Moreover, if the liquid is stirred during the process of converting it to a frozen condition, the time required to freeze the liquid is even further reduced. The resulting slush has also been found to be maintained in an ice-containing condition up to approximately 3 hours under room temperature conditions without requiring further refrigeration and without any undesired dilution of flavor due to the above-described construction. In summary, 10 minutes is usually more than adequate time to form a high quality slush from commercially available soft drinks despite certain time variations introduced by differences in the precooled liquid temperature, sugar content, and ingredients of the liquids to be cooled, particularly if it is stirred constantly after being added to the container 10 during formation of the slush. It will be appreciated that a substantial heat absorbing capability will remain in a unit of the above-described type wherein the liquid evolves a total amount of heat less than the total latent heat of fusion of the refrigerant, thereby providing a substantial so-called holding power for maintaining the slush in an ice-containing condition over an extended period of time.

Illustrated in FIG. 2 is another potable liquid cooling container 50 which may be used in slush-like present method. The liquid cooling container 50 is designed to be placed as a unit into a freezing compartment of a conventional refrigerator, and has a simplified construction for quick and easy manufacture. As in the container of FIG. 1, a large refrigerant zone is shown provided in a sealed compartment 52 (relative to the conversion zone defined by the inner receptacle 54) for receiving a sufficient mass of refrigerant 56 to effectively lower the temperature of the liquid contents of the inner receptacle 54 to a slush condition as previously described. In order to provide the enclosed refrigerant zone surrounding the conversion zone, an outer receptacle 58 is preferably spin welded to an outwardly extending radial flange 60 at an upper end portion of the inner receptacle 54. After a suitable mass of refrigerant 56 is placed in the compartment 52, a bottom wall 62 of the shell is fitted with a plug 64 which is spin welded in an appropriate opening 66 to effectively seal the refrigerant zone of the sealed compartment 52.

For ease of handling, portions of a handle 68 at its junctures 70, 72 with the outer receptacle 58 of the container 50 are preferably pinched off to provide a dead air space 74 within the handle 68 which is shown as being hollow as formed, e.g., from a blow mold manufacturing process. If desired, the handle 68 may also be filled with any suitable nonconductive insulating material or may even be formed as a solid plastic handle which would be readily warmed up after the liquid cooling container 50 is withdrawn from a freezing compartment of a refrigerator.

To provide a substantially fluidtight closure serving to extend the time the slush may be maintained in a frozen condition under room temperature conditions without further refrigeration, a cap 76 having a suitable contoured side wall portion 78 is provided in the embodiment shown in FIG. 2 to closely conform and frictionally engage a recessed lip portion 80 at the upper end portion of the outer receptacle 58. The cap 76 is preferably formed of a suitable plastic material which is at least partially resilient to conform to the more rigid plastic material of the lip portion 80 of the outer receptacle 58.

As previously indicated, the method of the present invention contemplates the provision of a conversion zone of preselected volume for containing an individual serving portion of a carbonated beverage during its conversion to a partially frozen, thixotropic condition. Accordingly, the volume of the conversion zone will ordinarily be from about 4 fluid ounces to about 16 fluid ounces, with the intermediate cup size of about 8 fluid ounces being an ideal volume for individual, personal use.

The enclosed refrigerant zone which is provided surrounding the conversion zone should also be of a preselected volume for accommodating the prescribed amount of normally liquid refrigerant. In this regard, in order to reliably produce a frozen carbonated beverage having a finely divided crystalline ice phase and a macroscopically uniform thixotropic consistency, the mass of refrigerant used in the method should be between about 0.7 and about 3.0 times the mass of the carbonated beverage or the like contained in the conversion zone. While the provision of mass ratios below about 0.7 may result in the formation of some ice crystals, particularly if the beverage is pre-chilled to a temperature near its freezing temperature, such ratios will not reliably provide a uniformly thixotropic frozen carbonated beverage of high quality. Similarly, the use of a ratio in excess of about 3.0 may provide undesirable results, and furthermore adds unnecessarily to the cost and weight of a portable cooling container constructed in accordance with such a ratio. In this regard, it takes a longer time to freeze the higher ratio of refrigerant proportioned to a conversion zone of a given volume, and in addition, the provision of a ratio in excess of about 3.0 has a tendency to overfreeze the beverage, particularly at the bottom of the conversion zone, so that it does not have a uniform, slush-like thixotropic consistency.

As an aqueous refrigerant will expand slightly upon freezing, the volume of the enclosed refrigerant zone should accordingly be slightly larger than the volume of the normally liquid refrigerant in order to accommodate the expansion without the buildup of pressures or forces upon freezing which might damage the walls of the refrigerant zone.

Since the specific gravities of a carbonated beverage and the refrigerant will ordinarily be of approximately equal values, it will be seen that the proper ratio of the volume of the refrigerant zone to the volume of the conversion zone will ordinarily also be between a value of from about 0.7 to about 3.0.

As also described herein above, the normally liquid refrigerant which is placed within the refrigerant zone should have a freezing point substantially below 32°F., or in a range between about 0°F. and about 31°F. Aqueous refrigerants, which have an intermediate freezing temperature such as about 20°F., e.g. between about 17° and about 23°F., may be frozen without difficulty in the freezer compartment of a conventional refrigerator and have been found to provide particularly desirable performance with respect to conversion of carbonated soft drinks to a uniformly thixotropic frozen beverage.

In this regard, an aqueous refrigerant which is particularly advantageous for use in the method of the present invention comprises an aqueous solution of urea and propylene glycol having a freezing point of between about 17° and about 23°F. Preferably the urea and propylene glycol area in specific proportions and may include minor amounts of preservatives, colorants, algicides and bacteriacides as desired. More particularly, the preferred aqueous refrigerant consists essentially of an aqueous solution of from about 15 to about 20 percent, or more preferably between about 16 and about 18 percent urea by weight based on the weight of the refrigerant solution, and from about 0.5 to about 3 percent, or more preferably between about 0.5 and about 2 percent by weight based on the weight of the solution, of a crystal slip agent such as propylene glycol.

The urea and the propylene glycol dissolve readily in the water principally making up the remainder of the refrigerant solution and provide the refrigerant with a selected freezing point due to the combined effect and the urea and the propylene glycol in depressing the freezing point of the aqueous solvent. Of course, based on the molal proportions of the urea and propylene glycol, the major increment of the total freezing point depression provided in the preferred refrigerant is due to the urea.

The use of urea as the principal freezing point depressant in the preferred aqueous refrigerant solutions has the advantage of providing a refrigerant which will not readily support bacterial growth.

As indicated, the propylene glycol component contributes a minor increment to the freezing point depression of the aqueous solvent of the refrigerant solution but its primary function when used in the indicated proportions is to serve as a crystal slip agent which enables the refrigerant to conform more readily to the confines of the refrigerant compartment of a cooling container as it freezes. A urea refrigerant solution without a crystal slip agent has a tendency to freeze into a solid mass of joined or interlocking crystals which rigidly expands as the refrigerant freezes without yielding to the shape of the refrigerant compartment. Such rigid expansion with a refrigerant compartment may exert undesirable pressures or forces on the walls which enclose and define the refrigerant compartment. In a plastic liquid cooling container having an inner receptacle and an outer compartment surrounding the inner receptacle, both of which are radially symmetrical about an upstanding central axis such as those illustrated in FIGS. 1 and 2, the rigid expansion of a solidified body of refrigerant as it freezes may have a tendency to exert considerable strain on the walls of the refrigerant compartment. These forces exerted on the compartment walls may eventually, upon repeated use, rupture the container, particularly along wall sections where such stress is concentrated, thus causing the destruction of the cooling container.

The provision of propylene glycol in the preferred refrigerant composition apparently functions to permit the refrigerant to conform to the refrigerant zone as it freezes rather than expanding rigidly against the boundaries of the confining zone. In this regard, it is believed that the propylene glycol may serve as a crystal slip agent which tends to permit individual ice crystals which form the refrigerant as it freezes to remain mobile with respect to each other rather than joining or interlocking together into a rigid mass, at least during the early stages of freezing. The propylene glycol may further tend to prevent ice crystals from adhering to the walls of the refrigerant zone. Thus, the effects of the expansion of the refrigerant may be dissipated through a moderate mobility imparted to the freezing refrigerant mass, which permits it to flow to a certain extent as it expands in order to yield to the confines of the refrigerant zone. For example, in liquid cooling containers such as those illustrated in FIGS. 1 and 2, the preferred refrigerant consisting essentially of an aqueous solution of urea and propylene glycol in the indicated proportions will tend to flow upwardly into the slight excess volume provided for this purpose at the top of the refrigerant compartment, rather than expanding outwardly in a rigid manner to exert undesirable strain on the compartment walls.

As indicated above, the preferred refrigerant, which consists essentially of water, urea, and propylene glycol, may also contain minor amounts of various other materials such as bacteriacides, algicides and preservatives which do not materially affect its refrigerant properties.

For example, such an aqueous refrigerant solution may contain 0.2 percent methyl parasepts (methyl ester of parahydroxybenzoic acid) and 0.04 percent propyl parasepts (propyl ester of parahydroxybenzoic acid) for algicidal and bactericidal activity, and about 0.1 percent sodium benzoate as a preservative, in amounts by weight, based on the weight of the refrigerant solution.

In carrying out the method, the normally liquid refrigerant in the refrigerant zone is subjected to freezing temperature conditions for a period of time sufficient to convert at least a portion of the refrigerant to the solid state, thereby providing the refrigerant zone with heat absorption capacity at least equivalent to the latent heat of fusion of the frozen portion of the refrigerant. Preferably, the refrigerant is substantially completely frozen so that the heat absorption capacity is maximized for the specified mass of refrigerant contained in the refrigeration zone volume.

In order to provide an explanation of the results of the present invention, the following theoretical analysis is set forth but is not intended to limit the actual scope of the method.

When a non-eutectic aqueous refrigerant solution, such as the preferred aqueous urea-propyleneglycol system, is cooled to its freezing temperature (i.e., the temperature at which ice is in equlibrium with the solution) ice crystals begin to form as the necessary latent heat of fusion for the phase transition from liquid to solid is removed by the cooling.

However, as heat energy is removed and the ice crystals form, it will be seen that water is preferentially removed from the remaining unfrozen refrigerant to thereby increase the concentration of solute. This in turn results in the remaining solution having a lower freezing point. As more ice is formed, the freezing temperature of the remainder further decreases, until a eutectic mixture is reached where all components solidify without preference.

In this manner, as the refrigerant is cooled to a temperature at which it is substantially completely frozen, a temperature continuum is provided extending below the freezing temperature of the refrigerant, for which an incremental increase or decrease in temperature will result in a respective incremental decrease or increase in the total latent heat of fusion of the refrigerant available for heat absorption purposes.

It is an advantageous feature of the method that a suitable refrigerant in the refrigerant compartment of a liquid cooling container may be frozen in the freezer compartment of a conventional refrigerator.

For a refrigerator freezer having a nominal storage temperature of from about $-10$ to about $10°F.$, an aqueous urea-propylene glycol refrigerant solution having a freezing temperature of about $20°F.$ in a portable plastic liquid cooling container such as illustrated in FIGS. 1 and 2, will ordinarily be substantially completely frozen in about 12 hours or less. Of course, refreezing of the refrigerant in the container which has not been completely melted will take a shorter time.

After the refrigerant has been frozen, an individual serving portion of the carbonated beverage is placed in the conversion zone. If a liquid cooling container such as those illustrated in FIGS. 1 and 2 is employed, the inner receptacle should best be filled with the beverage up to the level of the frozen refrigerant surrounding the inner receptacle so that the effective mass of the refrigerant is maximized. It will be seen that the effective mass (i.e., the mass of refrigerant in the refrigerant zone surrounding the beverage in a receptacle which is filled to a given level) will be decreased if the inner receptacle is not filled to the level of the frozen refrigerant.

For best results, the beverage should be pre-chilled as described hereinabove prior to introduction into the conversion zone. When placed in the conversion zone, the beverage is in heat transfer relationship with the frozen refrigerant in the refrigerant zone which surrounds the conversion zone. Accordingly, heat energy will be rapidly transferred from the beverage to the refrigerant. As the thermal equilibration between the beverage and refrigerant proceeds, the beverage is cooled to its freezing point, which is somewhat below the freezing point of water due to the freezing point depressing effect of the sugar and other beverage components such as flavorings. Ice crystals will subsequently begin to form in the beverage as the requisite latent heat of fusion is removed to the refrigerant zone. As ice crystals are formed in the beverage, it will again be seen that the remaining unfrozen component of the beverage will be enriched in sugar and other flavoring components, and will accordingly require a decrease in temperature in addition to the removal of the latent heat of fusion for the liquid-solid transition of additional ice formed in the beverage. Accordingly, at temperatures below the freezing point of a given carbonated beverage the proportion of ice which will be present at thermal equilibrium will be seen to be theoretically inversely related to the temperature, at least over the temperature range of interest for frozen carbonated beverages.

Concurrently with the cooling and formation of ice in the beverage, heat energy is being transferred to the refrigerant in the refrigerant zone, thus supplying the heat energy required to melt a portion of the refrigerant. In a non-eutectic refrigerant mixture such as the preferred water-urea-propylene glycol system, as a portion of the ice is melted, the temperature of the refrigerant will incrementally be raised in response to the dilution effect of the water thus supplied upon the liquid-solid equilibrium temperature of the refrigerant.

As the refrigerant continues to melt in response to heat supplied from the beverage (and the surrounding environment) it will increase in temperature to approach the freezing point of the initial refrigerant solution. Since the temperature of the beverage in the conversion zone will decrease as an increasing proportion is converted to ice crystals, it will be seen that the temperature differential between the beverage in the conversion zone and the refrigerant in the refrigerant zone will decrease with increasing conversion of the beverage. Accordingly, the rate at which heat energy is removed from the beverage to form ice crystals will also decrease as the beverage is converted to a slush-like condition.

Thus, as the beverage in the conversion zone is permitted to come to thermal equilibrium with the refrigerant in the refrigerant zone, the degree of crystalline ice formation in the beverage will tend to be stablized. Further, there will be a tendency to effect a dynamic equilibrium between the establishment of a relatively constant minimum temperature differential between the conversion zone and the refrigerant zone and the rate of heat absorbed by the partially frozen beverage from the environment.

After the formation of the frozen carbonated beverage, any remaining heat absorbing capacity of the refrigerant will serve to maintain the relatively thermally fragile structure of the partially frozen beverage.

As the beverage is being cooled and frozen in the conversion zone, it should be stirred, at least periodically, to insure proper formation of a uniformly thixotropic mixture. In this regard, stirring not only provides more rapid and efficient heat transfer by minimizing the preferential development of ice crystals or a thermal gradient adjacent the walls of the conversion zone, but also induces the formation of crystals throughout the beverage mass. The rapid cooling and induction of crystallization achieved through stirring the beverage in the conversion zone results in the development of a finely divided, delicately crystalline ice phase in the beverage. When the beverage is carbonated, the bubbles of carbon dioxide released or generated in the beverage have a beneficial effect on the proper formation of the two phase slush mixture. The presence of carbonation also seems to prevent icing on the walls of the receptacle and in addition tends to provide the benefits of stirring or agitation of the beverage.

In the initial stages of the conversion, the ice crystals tend to rise to the surface of the beverage if stirring is discontinued. However, as more ice is formed in the beverage pursuant to the continued thermal equilibration of the conversion and refrigerant zones, a two-phase mixture is provided which remains uniformly homogenous upon standing. This two-phase mixture comprises an unfrozen liquid component of the initial beverage in thermal equilibrium and intimate and macroscopically uniform admixture with the finely divided, delicately crystalline ice phase derived in situ from the beverage. The frozen carbonated beverage thus produced has a uniform thixotropic consistency suitable for consumption with either a spoon or a straw.

The following example describes a specific embodiment of the method of the present invention.

A liquid cooling container of the type illustrated in FIG. 1 is provided in which the inner receptacle has a capacity of 8 fluid ounces. The enclosed refrigerant zone compartment which surrounds the inner receptacle contains 11 fluid ounces of an aqueous refrigerant which consists essentially of an aqueous solution of 16 percent urea and 1 percent propylene glycol, and includes 0.2 percent methyl parasepts, 0.04 percent propyl parasepts, and 0.1 percent sodium benzoate.

The liquid cooling container is placed overnight in a refrigerator freezer operating at a storage temperature of 10°F. The propylene glycol tends to soften the ice formed as the refrigerant expands upon freezing to prevent the build-up of undesirable forces within the refrigerant compartment. Although the refrigerant expands the walls of the container slightly, the forces are relatively evenly distributed and are insufficient to harm the integrity of the container.

The cooling container is then removed from the freezer and placed in its shell under room temperature conditions. Eight ounces of a carbonated soft drink sold under the trade name Coca Cola which has been pre-chilled to a temperature of about 38°F. is then poured into the inner receptacle. A spoon is used to stir the soft drink and within a few minutes, minute, plate-like ice crystals may be observed in the soft drink which tend to accumulate at the surface of the beverage in a delicate, feathery mass if stirring is stopped. As the stirring and cooling of the soft drink continues, the quantity of ice crystals increases until a macroscopically uniform thixotropic mass is formed in the inner receptacle which may be eaten with a spoon or a straw, and which may be maintained in a partially frozen condition in the cooling container for a considerable period of time because of the excess cooling capacity of the refrigerant.

Although the present invention has been particularly described with respect to the conversion of carbonated beverages, other similar aqueous liquid comestibles may also be converted to a partially frozen state through the present method. For example, fruit juices may be thus provided in a slush-like condition, as well as naturally sweetened mixes for alcoholic beverages, which may be converted to a partially frozen state and subsequently mixed with the pre-chilled alcoholic component of the beverage.

As will be apparent to persons skilled in the art, various modifications, adaptations and variations of the foregoing specific disclosure can be made without departing from the teachings of this invention.

Various of the features of the invention are set forth in the following claims.

What is claimed is:

1. A method for the batch-wise conversion of an individual serving portion of a liquid carbonated beverage or the like to a partially frozen, two-phase composite mixture of macroscopically uniform thixotropic consistency, which method is particularly suited for home use and which may be easily practiced and repeated by the individual consumer, comprising, in combination, the steps of providing a wall zone of tough plastic material which defines a conversion zone of preselected volume for containing an individual serving portion of the carbonated beverage, providing an enclosed fluidtight refrigerant zone of preselected volume containing an amount of normally liquid aqueous refrigerant which is refreezable in said refrigerant zone and having a freezing point of about 20°F. such that the ratio of the mass of said refrigerant to the mass of said individual serving portion of liquid carbonated beverage is between about 0.7 and about 3.0 whereby said refrigerant zone partially surrounds and is in heat transfer relationship through said tough plastic wall zone with said conversion zone, subjecting said refrigerant zone to freezing temperature conditions for a period of time sufficient to freeze said refrigerant to the solid state, subsequently placing said individual serving portion of the liquid carbonated beverage in said conversion zone whereby the liquid carbonated beverage is in heat transfer relationship through said tough plastic wall zone with the frozen refrigerant in said refrigerant zone, and transferring heat energy from the liquid carbonated beverage to the refrigerant to produce a two-phase composite mixture of an unfrozen liquid component of the initial liquid carbonated beverage in thermal equilibrium and in intimate admixture with a finely divided crystalline ice phase.

2. A method in accordance with claim 1 wherein the liquid comestible is a naturally sweetened non-alcoholic component of an alcoholic beverage, and wherein the alcoholic component is added subsequent to the formation of a finely divided crystalline ice phase in the non-alcoholic component.

3. The method in accordance with claim 1 wherein the carbonated beverage is pre-chilled prior to placement in the conversion zone.

4. The method in accordance with claim 3 wherein said mass ratio is about 2.0.

5. The method in accordance with claim 1 wherein said refrigerant consists essentially of between about 77 and about 84.5 percent by weight water, between about 15 and about 20 percent by weight urea, and between about 0.5 and about 3 percent propylene glycol.

6. The method of claim 1 wherein the ratio of the fluid volume of said refrigerant to the fluid volume of said conversion zone is about 1.4.

7. A method in accordance with claim 5 wherein the freezing temperature of said aqueous urea-based refrigerant is in the range of 17° to 23°F.

* * * * *